United States Patent
Kim et al.

(10) Patent No.: US 10,972,693 B2
(45) Date of Patent: *Apr. 6, 2021

(54) IMAGE SENSOR FOR IMPROVING LINEARITY OF ANALOG-TO-DIGITAL CONVERTER AND IMAGE PROCESSING SYSTEM INCLUDING THE SAME

(71) Applicant: SAMSUNG ELECTRONICS CO., LTD., Suwon-si (KR)

(72) Inventors: Jae Hong Kim, Suwon-si (KR); Seung Hyun Lim, Hwaseong-si (KR); Han Kook Cho, Suwon-si (KR); Dong Hun Lee, Yongin-si (KR); Seog Heon Ham, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/727,571

(22) Filed: Dec. 26, 2019

(65) Prior Publication Data

US 2020/0137344 A1 Apr. 30, 2020

Related U.S. Application Data

(63) Continuation of application No. 16/121,586, filed on Sep. 4, 2018, now abandoned, which is a continuation
(Continued)

(30) Foreign Application Priority Data

Apr. 10, 2015 (KR) .................. 10-2015-0050840

(51) Int. Cl.
*H04N 5/374* (2011.01)
*H04N 5/3745* (2011.01)
(Continued)

(52) U.S. Cl.
CPC ....... *H04N 5/37455* (2013.01); *H04N 5/3658* (2013.01); *H04N 5/374* (2013.01); *H04N 5/378* (2013.01)

(58) Field of Classification Search
CPC .. H04N 5/37455; H04N 5/378; H04N 5/3658; H04N 5/374
See application file for complete search history.

(56) References Cited

U.S. PATENT DOCUMENTS

| 6,489,798 B1 * | 12/2002 | Scott-Thomas ........ H04N 5/374 324/762.01 |
| 6,545,624 B2 | 4/2003 | Lee et al. |

(Continued)

FOREIGN PATENT DOCUMENTS

| CN | 102438109 A | 5/2012 |
| CN | 103986468 A | 8/2014 |

OTHER PUBLICATIONS

Communication dated Oct. 24, 2019 issued by the State Intellectual Property Office of P.R. China in counterpart Chinese Application No. 201610216855.7.
(Continued)

*Primary Examiner* — Twyler L Haskins
*Assistant Examiner* — Angel L Garces-Rivera
(74) *Attorney, Agent, or Firm* — Sughrue Mion, PLLC

(57) ABSTRACT

An image sensor and an image processing system including the same are provided. The image sensor includes a pixel array including a plurality of pixels each connected to one of first through m-th column lines to output a pixel signal, where "m" is an integer of at least 2; analog-to-digital converters each configured to receive the pixel signal corresponding to one of the first through m-th column lines, to compare the pixel signal with a ramp signal, and to convert the pixel signal to a digital pixel signal; and a blocking circuit connected to an input terminal of at least one of the
(Continued)

analog-to-digital converters to block an influence of an operation of others among the analog-to-digital converters.

20 Claims, 17 Drawing Sheets

Related U.S. Application Data of application No. 15/087,043, filed on Mar. 31, 2016, now Pat. No. 10,084,982.

(51) Int. Cl.
*H04N 5/365* (2011.01)
*H04N 5/378* (2011.01)

(56) References Cited

U.S. PATENT DOCUMENTS

| | | | |
|---|---|---|---|
| 6,885,331 B2 | 4/2005 | Krymski | |
| 7,075,470 B2 | 7/2006 | Lee | |
| 7,116,138 B2 | 10/2006 | Lim | |
| 7,265,329 B2 | 9/2007 | Henderson et al. | |
| 7,518,646 B2 | 4/2009 | Zarnowski et al. | |
| 7,710,306 B2 | 5/2010 | Mori | |
| 8,305,474 B2 | 11/2012 | Purcell et al. | |
| 8,482,448 B2 | 7/2013 | Burm et al. | |
| 8,614,639 B1 | 12/2013 | Yin et al. | |
| 8,816,893 B1 | 8/2014 | Yang | |
| 8,836,313 B2 | 9/2014 | Takagi et al. | |
| 8,841,594 B2 | 9/2014 | Lee | |
| 10,084,982 B2 * | 9/2018 | Kim | H04N 5/378 |
| 2008/0273091 A1 | 11/2008 | Matsuo et al. | |
| 2010/0289936 A1 | 11/2010 | Kimura et al. | |
| 2012/0161998 A1 | 6/2012 | Burm et al. | |
| 2016/0205333 A1 | 7/2016 | Shishido et al. | |

OTHER PUBLICATIONS

Jae-hong Kim et al., "A 14b Extended Counting ADC Implemented in a 24MPixel APS-C CMOS Image Sensor", 2012 IEEE International Solid-State Circuits Conference, Session 22, Feb. 22, 2012, pp. 390-392.

Seogheon Ham et al., "CMOS Image Sensor with Analog Gamma Correction using Nonlinear Single-Slope ADC", IEEE, 2006, pp. 3578-3581.

* cited by examiner

IMAGE SENSOR FOR IMPROVING LINEARITY OF ANALOG-TO-DIGITAL CONVERTER AND IMAGE PROCESSING SYSTEM INCLUDING THE SAME

CROSS-REFERENCE TO RELATED APPLICATIONS

This application is a Continuation Application of U.S. patent application Ser. No. 16/121,586 filed Sep. 4, 2018, which is a Continuation Application of U.S. application Ser. No. 15/087,043 filed Mar. 31, 2016, which issued as U.S. Pat. No. 10,084,982 and claims priority from Korean Patent Application No. 10-2015-0050840 filed on Apr. 10, 2015, the entire contents of each of which are hereby incorporated by reference in their entireties.

BACKGROUND

Apparatuses and systems consistent with the present disclosure relate to an image sensor, and more particularly, to an image sensor for increasing image quality by improving the linearity of an analog-to-digital converter, and an image processing system including the same.

Complementary metal oxide semiconductor (CMOS) image sensors are solid-state sensing devices using CMOS. CMOS image sensors have lower manufacturing cost and smaller size than charge coupled device (CCD) image sensors having a high-voltage analog circuit. Thus, CMOS image sensors have an advantage of low power consumption. In addition, the performance of CMOS image sensors has been improved as compared to an early development stage, and therefore, CMOS image sensors are typically used for various electronic appliances including portable devices such as smart phones and digital cameras.

With increasing user demand for high-speed photography and high color sensitivity at low luminance in portable devices, an image sensor meeting the demand is increasingly desired.

SUMMARY

According to an aspect of an exemplary embodiment, there is provided an image sensor including a pixel array including a plurality of pixels, each pixel of the plurality of pixels connected to one of first through m-th column lines to output a pixel signal, where "m" is an integer of at least 2; a plurality of analog-to-digital converters, each analog-to-digital converters of the plurality of analog-to-digital converters configured to receive the pixel signal corresponding to one of the first through m-th column lines, to compare the pixel signal with a ramp signal, and to convert the pixel signal to a digital pixel signal; and a blocking circuit connected to an input terminal of at least one analog-to-digital converters of the plurality of analog-to-digital converters to block an influence of an operation of other analog-to-digital converters among the plurality of analog-to-digital converters.

The image sensor may further include a ramp signal generator configured to generate the ramp signal; and a ramp signal buffer configured to buffer and output the ramp signal.

The blocking circuit may include a plurality of buffers, each buffer of the plurality of buffers connected between an input terminal of a corresponding analog-to-digital converter of the plurality of analog-to-digital converters and the ramp signal buffer.

The plurality of analog-to-digital converters may be divided into at least two groups, the blocking circuit may include a plurality of buffers, and each buffers of the plurality of buffers is connected between a corresponding group of the at least two groups and the ramp signal buffer.

Each buffer of the plurality of buffers may include an N-channel metal oxide semiconductor (NMOS) transistor which is connected between a power supply voltage and the input terminal of the corresponding analog-to-digital converter, and has a gate which receives the ramp signal.

Each buffer of the plurality of buffers may include a P-channel metal oxide semiconductor (PMOS) transistor which is connected between the input terminal of the corresponding analog-to-digital converter and a ground voltage, and has a gate which receives the ramp signal.

Each buffer of the plurality of buffers may include a first P-channel metal oxide semiconductor (PMOS) transistor connected between a power supply voltage and a first node; a second PMOS transistor connected between the power supply voltage and a second node; a first N-channel metal oxide semiconductor (NMOS) transistor which is connected between the first node and a common node, and a has gate which receives the ramp signal; a second NMOS transistor which is connected between the second node and the common node and has a gate connected to the input terminal of the corresponding analog-to-digital converter; and a current source connected between the common node and a ground voltage.

Each analog-to-digital converter of the plurality of analog-to-digital converters may include a comparator configured to compare the pixel signal with the ramp signal to generate a comparison signal; and a counter configured to generate the digital pixel signal according to the comparison signal.

The number of the pixels may be at least ten million and an operating speed of the counter may be at least 1 GHz.

Accord to an aspect of another exemplary embodiment, there is provided an image processing system including an image sensor including first through m-th pixels connected to first through m-th column lines, respectively, to output first through m-th pixel signals, respectively, where "m" is an integer of at least 2; a processor configured to control the image sensor; and a display configured to display image data based on a signal output from the image sensor, wherein the image sensor further includes a ramp signal generator configured to generate a ramp signal; a ramp signal buffer configured to buffer and output the ramp signal; a plurality of analog-to-digital converters, each analog-to-digital converter of the plurality of analog-to-digital converters being configured to receive a pixel signal of the pixel signals which corresponds to one of the first through m-th column lines, to compare the pixel signal with the ramp signal, and to convert the pixel signal to a digital pixel signal; and a blocking circuit connected between an output terminal of the ramp signal buffer and an input terminal of at least one analog-to-digital converter among the plurality of analog-to-digital converters.

Each analog-to-digital converter of the plurality of analog-to-digital converters may include a comparator configured to compare the pixel signal with the ramp signal to generate a comparison signal; and a counter configured to generate the digital pixel signal according to the comparison signal.

The blocking circuit may include a plurality of buffers, each buffer of the plurality of buffers connected between the input terminal of a corresponding analog-to-digital converter of the plurality of analog-to-digital converters and the ramp signal buffer.

Each buffer of the plurality of buffers may include an N-channel metal oxide semiconductor (NMOS) transistor which is connected between a power supply voltage and the input terminal of the corresponding analog-to-digital converter, and has a gate which receives the ramp signal; and a current source connected between the input terminal of the corresponding analog-to-digital converter and a ground voltage.

Each buffer of the plurality of buffers may include a P-channel metal oxide semiconductor (PMOS) transistor which is connected between the input terminal of the corresponding analog-to-digital converter and a ground voltage, and has a gate which receives the ramp signal; and a current source connected between a power supply voltage and the input terminal of the corresponding analog-to-digital converter.

Each buffer of the plurality of buffers may include a first P-channel metal oxide semiconductor (PMOS) transistor connected between a power supply voltage and a first node; a second PMOS transistor connected between the power supply voltage and a second node; a first N-channel metal oxide semiconductor (NMOS) transistor which is connected between the first node and a common node, and has a gate which receives the ramp signal; a second NMOS transistor which is connected between the second node and the common node and has a gate connected to the input terminal of the corresponding analog-to-digital converter; and a current source connected between the common node and a ground voltage.

The plurality of analog-to-digital converters may be divided into at least two groups and the blocking circuit may include a plurality of buffers, each buffer of the plurality of buffers connected a corresponding group of the at least two groups and the ramp signal buffer.

Each buffer of the plurality of buffers may include an N-channel metal oxide semiconductor (NMOS) transistor which is connected to the input terminals of the analog-to-digital converters in the corresponding group of the at least two groups, and has a gate which receives the ramp signal; and a current source connected in common to the input terminals of the analog-to-digital converters in the group.

Each buffer of the plurality of buffers may include a P-channel metal oxide semiconductor (PMOS) transistor which is connected to the input terminals of the analog-to-digital converters in the corresponding group of the at least two groups, and a gate of the PMOS transistor receives the ramp signal; and a current source connected in common to the input terminals of the analog-to-digital converters in the group.

The number of the pixels may be at least ten million and an operating speed of the counter may be at least 1 GHz.

According to an aspect of another exemplary embodiment, there is provided an image sensor including a pixel array including a plurality of pixels, each pixel of the plurality of pixels connected to one of first through m-th column lines to output a pixel signal, where "m" is an integer of at least 2; a ramp signal generator configured to generate a ramp signal; a ramp signal buffer configured to buffer and output the ramp signal; a plurality of comparators, each comparator of the plurality of comparators configured to receive a pixel signal of the pixel signals which corresponds to one of the first through m-th column lines, to compare the pixel signal with the ramp signal, and to generate a comparison signal; a plurality of counters each configured to generate a digital signal according to the comparison signal; and a blocking circuit connected between an output terminal of the ramp signal buffer and an input terminal of at least one comparator of the plurality of comparators, wherein each comparator of the plurality of comparators receives the ramp signal through the blocking circuit and compares the ramp signal with the pixel signal.

The blocking circuit may include a plurality of buffers, each buffer of the plurality of buffers connected between the input terminal of a corresponding comparator of the comparators and the ramp signal buffer.

The blocking circuit may include a plurality of buffers, each buffer of the plurality of buffers connected between the input terminals of at least two comparators of the comparators and the ramp signal buffer.

According to an aspect of another exemplary embodiment, there is provided an image sensor including a ramp signal generator that includes an output buffer and is configured to generate a ramp signal; a plurality of analog-to-digital converters each configured to receive a pixel signal, to compare the pixel signal with the ramp signal, and to convert the pixel signal to a digital pixel signal; and a blocking circuit connected between the ramp signal generator and the plurality of analog-to-digital converters.

The blocking circuit may include a plurality of buffers connected in common to the ramp signal generator.

A buffer may be provided for each of the analog-to-digital converters in a one-to-one relationship.

The buffer may isolate the analog-to-digital converter to which the buffer is connected from the ramp signal generator.

The analog-to-digital converters may be divided at least two groups, and a buffer may be provided for each of the groups.

The buffer may isolate the group of analog-to-digital converters to which the buffer is connected from the ramp signal generator.

Each buffer may include a transistor and a current source.

Each buffer may include an analog buffer that has a first input terminal connected to the ramp signal generator, and a second input terminal connected to an output terminal of the buffer.

BRIEF DESCRIPTION OF THE DRAWINGS

The above and other aspects will become more apparent by describing in detail exemplary embodiments with reference to the attached drawings in which.

DETAILED DESCRIPTION OF EXEMPLARY EMBODIMENTS

Figure 1:
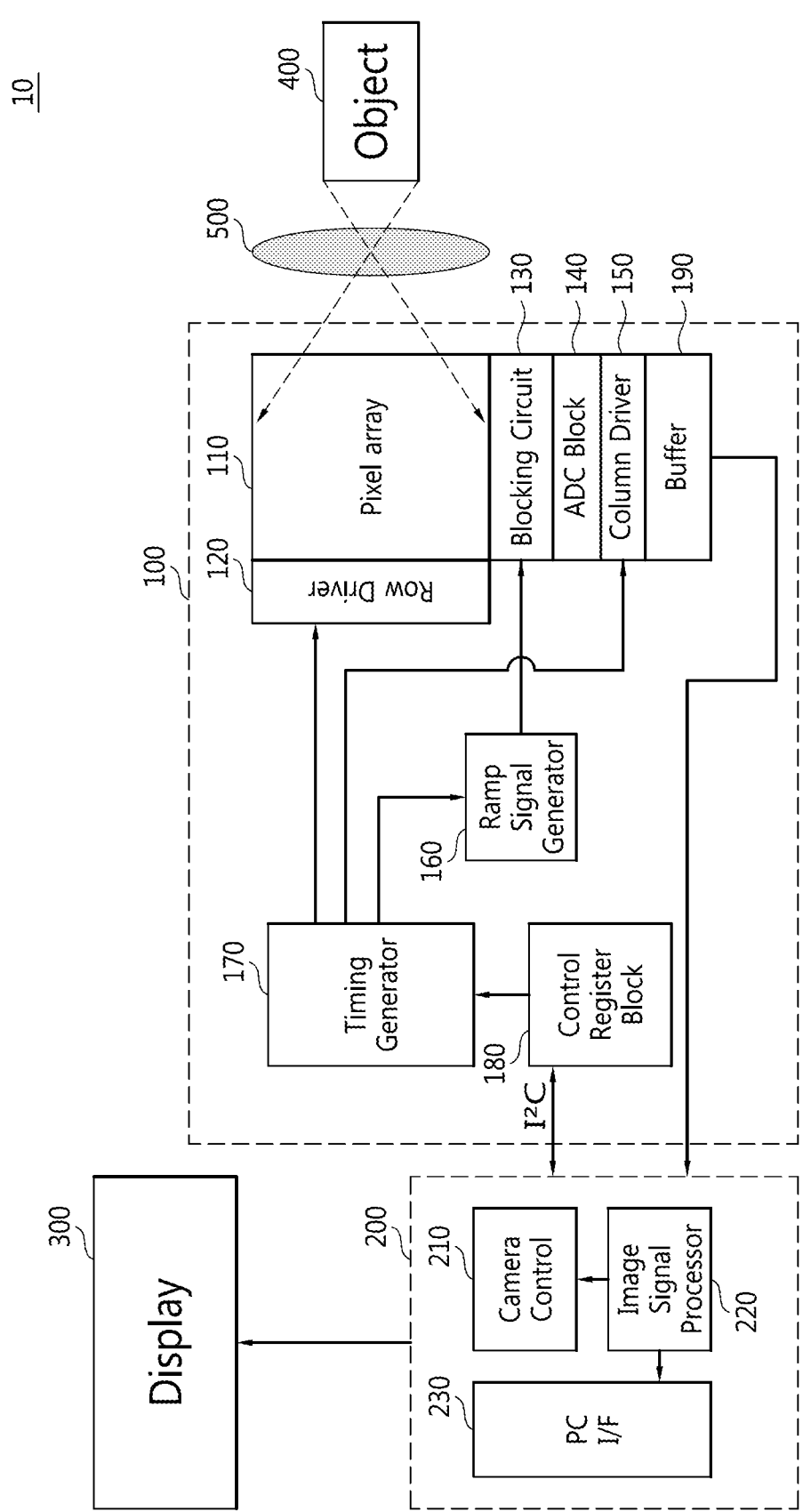
FIG. 1 is an image processing system including an image sensor according to some exemplary embodiments.

Exemplary embodiments now will be described more fully hereinafter with reference to the accompanying drawings. The inventive concept may, however, be embodied in many different forms and should not be construed as limited to the exemplary embodiments set forth herein. Rather, these exemplary embodiments are provided so that the disclosure will be thorough and complete, and will fully convey the scope of the inventive concept to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms "first", "second", etc. may be used herein to describe various elements, these elements should not be limited by these terms. These terms are only used to distinguish one element from another. For example, a "first" signal could be termed a "second" signal, and, similarly, a "second" signal could be termed a "first" signal without departing from the teachings of the disclosure.

The terminology used herein is for the purpose of describing particular exemplary embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of an image processing system 10 including an image sensor 100 according to some exemplary embodiments. The image processing system 10 may include the image sensor 100, an image processor (or a digital signal processor (DSP)) 200, a display 300, and a lens 500. The image sensor 100 may include a pixel array 110, a row driver 120, a blocking circuit 130, an analog-to-digital converter (ADC) block 140, a column driver 150, a ramp signal generator 160, a timing generator 170, a control register block 180, and a buffer 190.

The image sensor 100 is controlled by the DSP 200 to sense an object 400 captured through the lens 500. The DSP 200 may output an image, which has been sensed and output by the image sensor 100, to the display 300. The display 300 may be any device that can output an image. For instance, the display 300 may be a computer, a cellular phone, or an electronic device equipped with a camera.

The DSP 200 may include a camera control 210, an image signal processor (ISP) 220, and a personal computer (PC) interface (I/F) 230. The camera control 210 controls the control register block 180 of the image sensor 100. The camera control 210 may control the image sensor 100, and more specifically, the control register block 180 using an inter-integrated circuit ($I^2C$), but the scope of the inventive concept is not restricted thereto.

The ISP 220 receives image data, i.e., an output signal of the buffer 190; processes the image data into an image for people to look at; and outputs the image to the display 300 through the PC I/F 230. The ISP 220 is positioned within the DSP 200 in the exemplary embodiments illustrated FIG. 1, but the configuration may be changed by those skilled in the art. For example, in other exemplary embodiments, the ISP 220 may be positioned within the image sensor 100.

The pixel array 110 includes a plurality of pixels (115 in FIG. 2) including a photoelectric conversion element such as a photodiode or a pinned photodiode. Each pixel 115 senses light using the photoelectric conversion element and converts the light into an electrical signal to generate an image signal.

The timing generator 170 may output a control signal or a clock signal to the row driver 120, the ramp signal generator 160, and the column driver 150 to control the operation or the timing of the row driver 120, the ramp signal generator 160, and the column driver 150. The control register block 180 may transmit a control signal or a clock signal from the DSP 200 to the timing generator 170.

The row driver 120 drives the pixel array 110 in units of rows. For instance, the row driver 120 may generate control signals (RCS1 through RCSn in FIG. 2A or 2B) for controlling the pixels 115 forming the pixel array 110. The pixel array 110 may output pixel signals (PS1 through PSm in FIG. 2A or 2B) from a row selected by the control signals RCS1 through RCSn of the row driver 120 to the ADC block 140. The pixel signals PS1 through PSm are analog signals.

The ADC block 140 converts the pixel signals PS1 through PSm received from the pixel array 110 into digital signals (DP1 through DPm in FIG. 2A or 2B) using a ramp signal (Ramp in FIG. 2A or 2B) received from the ramp signal generator 160 and outputs the digital signals DP1 through DPm to the buffer 190.

The column driver 150 may control the operations of the ADC block 140 and the buffer 190 according to the control of the timing generator 170. In other words, the column driver 150 may control the generation and the output timing of a digital pixel signal for each column of the pixel array 110.

The buffer 190 temporarily stores the digital signals DP1 through DPm output from the ADC block 140 and senses and amplifies the digital signals DP1 through DPm before outputting the digital signals DP1 through DPm.

Figure 2A:
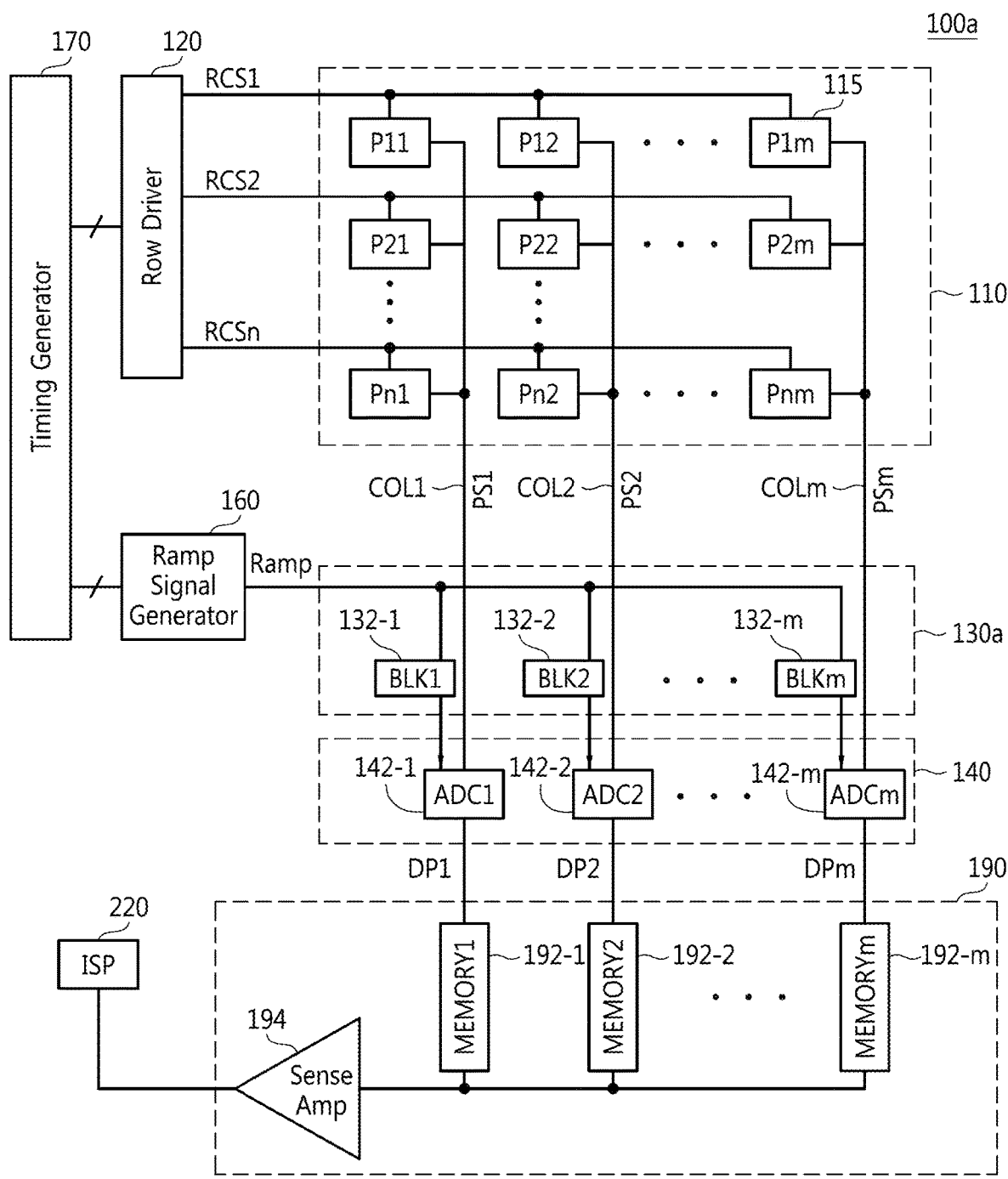
FIGS. 2A and 2B are detailed diagrams of examples of the image sensor illustrated in FIG. 1.
Figure 2B:
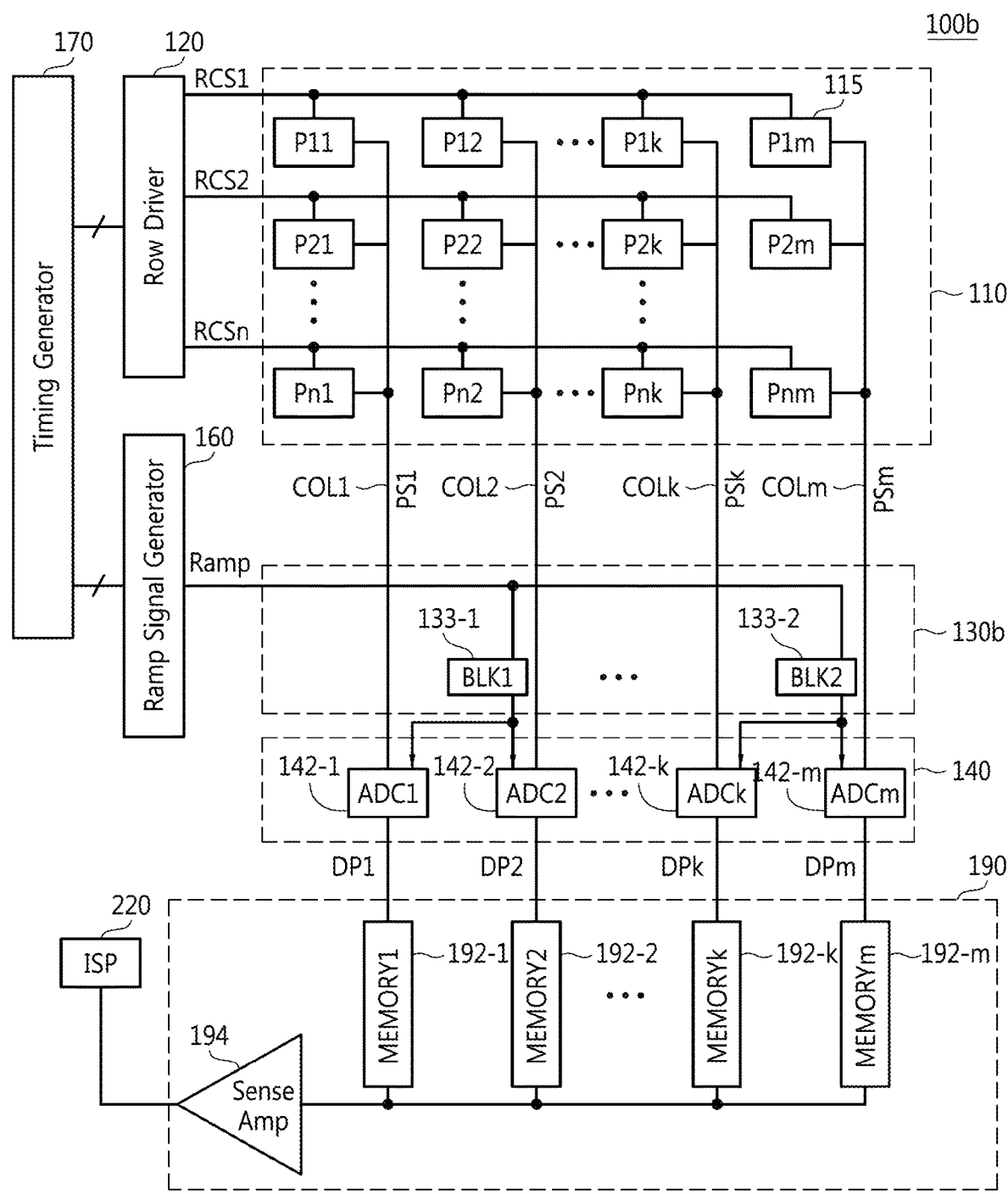

FIGS. 2A and 2B are detailed diagrams of examples 100*a* and 100*b*, respectively, of the image sensor 100 illustrated in FIG. 1. FIGS. 3A through 3E are circuit diagrams of examples 115*a* through 115*e* of a pixel 115 illustrated in FIG. 2A or 2B. The image sensor 100*a* illustrated in FIG. 2A and the image sensor 100*b* illustrated in FIG. 2B include the pixel array 110, the row driver 120, the blocking circuit 130, the ADC block 140, the column driver 150, the ramp signal generator 160, and the buffer 190.

The pixel array 110 may include a plurality of pixels P11 through Pnm (also referred to as pixel 115) each connected to one of a plurality of row lines RCS1 through RCSn and one of a plurality of column lines COL1 through COLm. The pixel array 110 may be formed by vertically stacking a semiconductor substrate, an interlayer insulation layer, a color filter layer, and microlenses. The semiconductor substrate may be formed by forming a p-type epitaxial layer on a p-type bulk silicon substrate. A photodiode may be formed by implanting n-type ions into the p-type epitaxial layer. The interlayer insulation layer may be formed on the semiconductor substrate. The interlayer insulation layer may include gates of transistors forming a pixel and multi-layer conductive lines.

A protective layer may be formed on the interlayer insulation layer to protect elements. The color filter layer may be formed on the interlayer insulation layer (or the protective layer) and may include a plurality of color filters. Bayer pattern technology may be applied to the color filter layer. For instance, color filters may include at least one red filter, at least one green filter, and at least one blue filter or may include at least one magenta filter, at least one cyan filter, and at least one yellow filter. A flat layer called an over-coating layer may be formed on the color filter layer. The microlenses are formed on the color filter layer (or the flat layer) to efficiently guide incident light to the photodiode of the pixel.

The pixels 115 may be sequentially activated in response to the row control signals RCS1 through RCSn output from the row driver 120 and may output the pixel signals PS1 through PSm to the respective column lines COL through COLm. The each of the pixel signals PS1 through PSm may include a reset signal and an image signal. The voltage difference between the reset signal and the image signal may include information about the quantity of light received by each pixel 115. When a pixel 115 does not receive any light, the reset signal may be the same as the image signal. When the pixel 115 receives light, the voltage of the reset signal may be higher than that of the image signal. However, the inventive concept is not restricted to the current exemplary embodiments.

The examples 115*a* through 115*e* of each of the pixels 115 are illustrated in FIGS. 3A through 3E. In FIGS. 3A through 3E, various combinations of a reset control signal RS, a transfer control signal TG, a selection control signal SEL, and/or a photogate signal PG may be included in one of the row control signals RCS1 through RCSn illustrated in FIG. 2A or 2B.

Figure 3A:
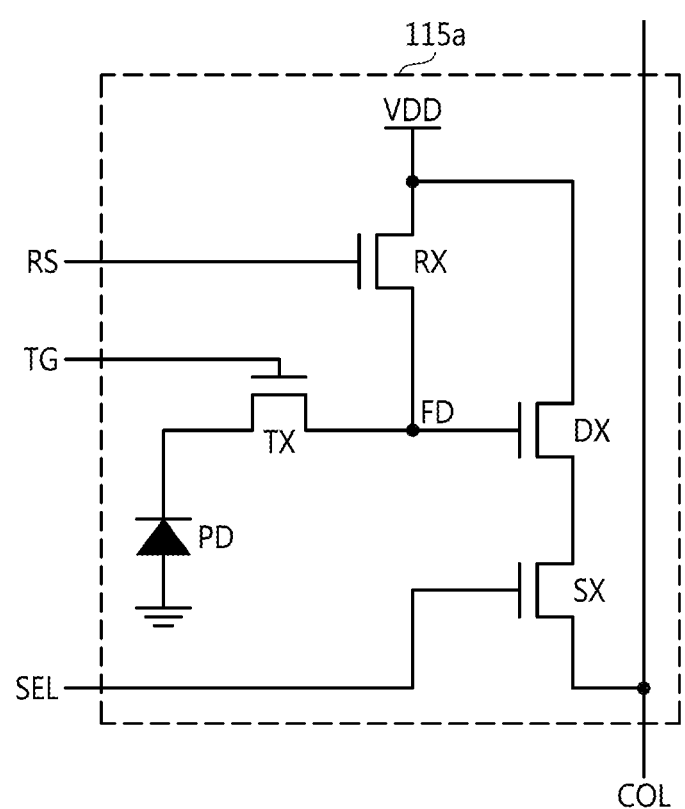
FIGS. 3A, 3B, 3C, 3D and 3E are circuit diagrams of examples of a pixel illustrated in the image sensor of FIG. 2A or 2B.

Referring to FIG. 3A, the pixel 115*a* may include a photodiode PD, a transfer transistor TX, a floating diffusion node FD, a reset transistor RX, a drive transistor DX, and a select transistor SX. The photodiode PD is an example of a photoelectric conversion element and may include at least one among a photo transistor, a photogate, a pinned photodiode (PPD), and a combination thereof. FIG. 3A shows a 4-transistor (4T) structure that includes one photodiode PD and four metal oxide semiconductor (MOS) transistors TX, RX, DX, and SX, but the inventive concept is not restricted to this example.

In the operation of the pixel 115*a*, the photodiode PD holds photocharges generated according to the intensity of light coming from the object 400. The transfer transistor TX may transfer the photocharges to the floating diffusion node FD in response to the transfer control signal TG received from the row driver 120. The drive transistor DX may amplify and transmit the photocharges to the select transistor SX according to potential arising from the photocharges accumulated at the floating diffusion node FD.

The select transistor SX has a drain terminal connected to a source terminal of the drive transistor DX. The select transistor SX may output a pixel signal to a column line COL connected to the pixel 115*a* in response to the select control signal SEL received from the row driver 120. The column line COL is one among the column lines COL1 through COLm illustrated in FIG. 2A or 2B. The pixel signal is one among the pixel signals PS1 through PSm illustrated in FIG. 2A or 2B.

The reset transistor RX may reset the floating diffusion node FD to a power supply voltage VDD in response to the reset control signal RS received from the row driver 120. The pixel signal is either a reset signal or an image signal. The reset signal is a signal which the select transistor SX outputs after the floating diffusion node FD is reset to the power supply voltage VDD by the reset transistor RX. The image signal is a signal which the select transistor SX outputs after the transmission of photocharges from the transfer transistor TX to the floating diffusion node FD is completed. The pixel 115*a* may sequentially outputs the reset signal and the image signal according to the control of the row driver 120.

Other examples 115*b* through 115*e* of the pixel 115 are illustrated in FIGS. 3B through 3E.

Figure 3B:
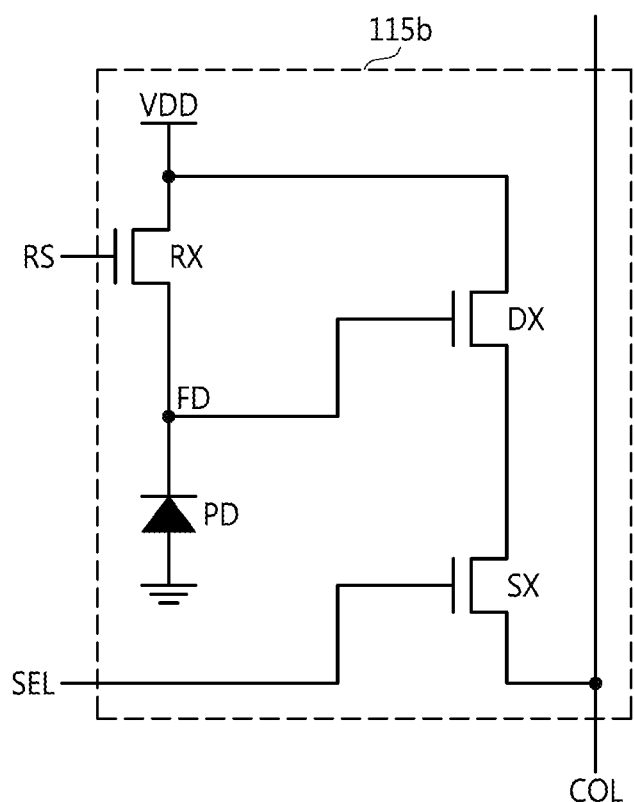

Referring to FIG. 3B, the pixel 115*b* is a unit pixel having a 3T structure. The pixel 115*b* may include the photodiode PD, the reset transistor RX, the drive transistor DX, and the select transistor SX. Photocharges generated by the photodiode PD may be accumulated at the floating diffusion node FD. A pixel signal may be output to the column line COL according to the operations of the drive transistor DX and the select transistor SX.

Figure 3C:
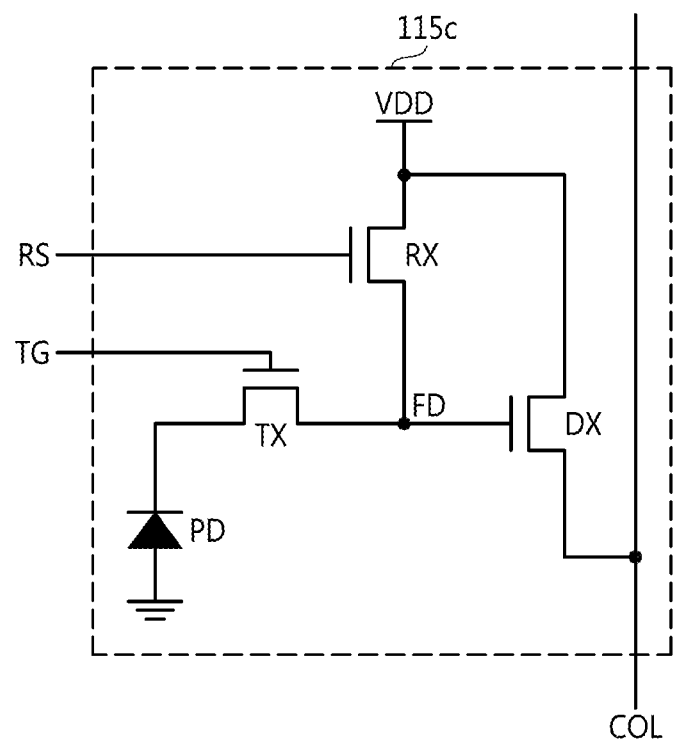

Referring to FIG. 3C, the pixel 115*c* is a unit pixel having a 3T structure. The pixel 115*c* may include the photodiode PD, the transfer transistor TX, the reset transistor RX, and the drive transistor DX. The reset transistor RX may be implemented as an n-channel depression type transistor. The reset transistor RX may reset the floating diffusion node FD to the power supply voltage VDD according to the reset control signal RS output from the row driver 120 or may set the floating diffusion node FD to a low level (e.g., 0 V) and perform a similar function to the select transistor SX.

Figure 3D:
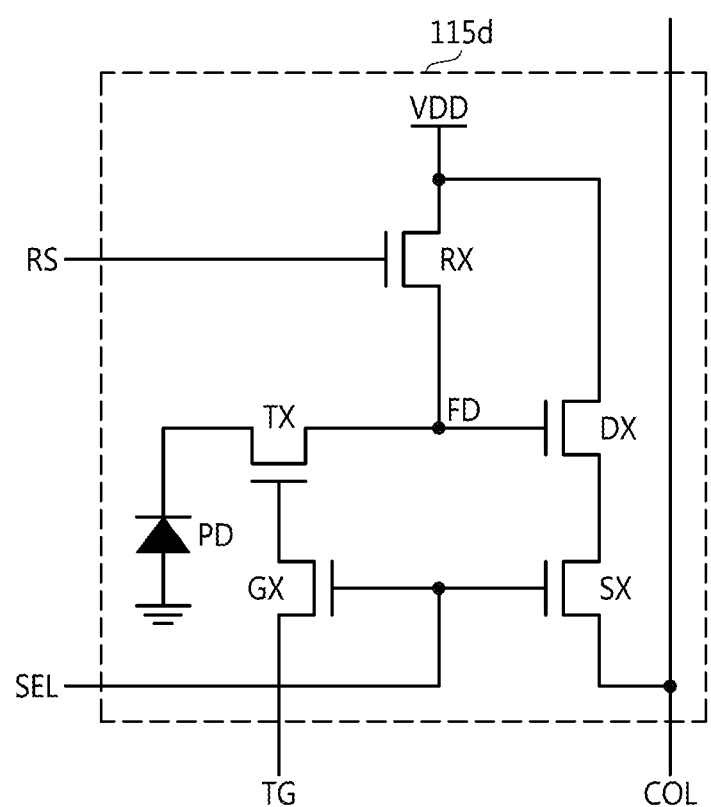

Referring to FIG. 3D, the pixel 115*d* is a unit pixel having a 5T structure. The pixel 115*d* includes the photodiode PD, the transfer transistor TX, the reset transistor RX, the drive transistor DX, the select transistor SX, and another transistor GX.

Figure 3E:
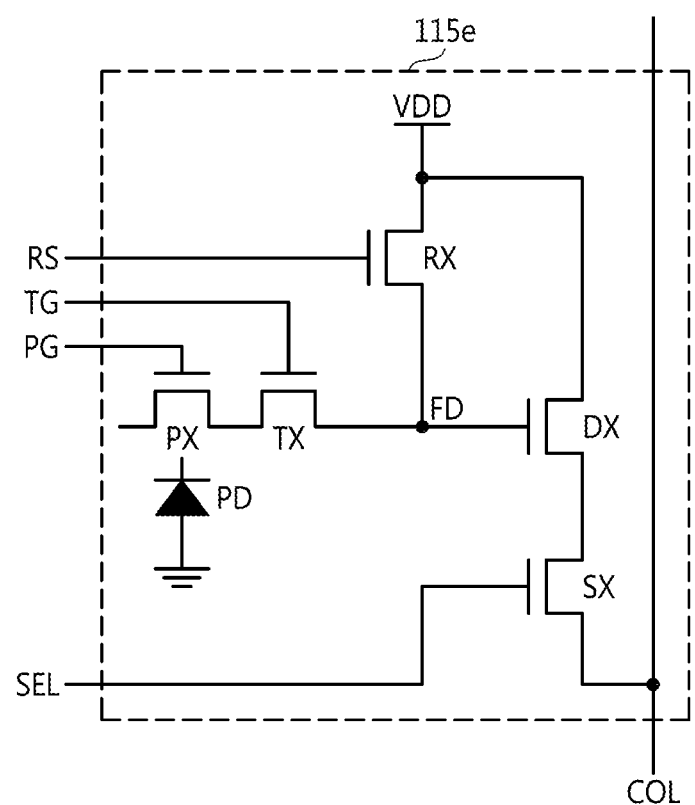

Referring to FIG. 3E, the pixel 115e is a 5T unit pixel which includes the photodiode PD, the transfer transistor TX, the reset transistor RX, the drive transistor DX, the select transistor SX, and a photo transistor PX. The photo transistor PX outputs photocharges to the transfer transistor TX according to the photogate signal PG output from the row driver 120.

FIGS. 3A through 3E show examples of 3T, 4T, and 5T unit pixels, but the inventive concept is not restricted to these examples. In other words, the pixel 115 may be implemented as a circuit which includes a photoelectric conversion element generating photocharges according to the quantity or intensity of light and at least one transistor outputting the photocharges generated by the photoelectric conversion element as a current or voltage signal.

Referring back to FIG. 2A or 2B, the row driver 120 may select at least one of the row lines forming the pixel array 110 using the row control signals RCS1 through RCSn.

The ADC block 140 may include first through m-th ADCs 142-1 through 142-m. The first through m-th ADCs 142-1 through 142-m are respectively connected to the first through m-th column lines COL through COLm. The first through m-th ADCs 142-1 through 142-m may receive the first through m-th pixel signals PS1 through PSm, respectively, and the ramp signal Ramp from the ramp signal generator 160, and may respectively convert the first through m-th pixel signals PS1 through PSm into the digital pixel signals DP1 through DPm using the ramp signal Ramp. In detail, each of the first through m-th ADCs 142-1 through 142-m may compare the ramp signal Ramp with a corresponding pixel signal, may generate a comparison signal corresponding to the comparison result, and may perform counting on the comparison signal to generate a corresponding one of the digital pixel signals DP1 through DPm. The digital pixel signals DP1 through DPm may be stored in the buffer 190.

The blocking circuit 130 is connected to the input of at least one of the first through m-th ADCs 142-1 through 142-m to block the influence of the operation of the other ADCs. In detail, the blocking circuit 130 may prevent a change in input capacitance caused by the operation of each of the ADCs 142-1 through 142-m from influencing the load of the ramp signal generator 160, thereby blocking the influence of the operation of the other ADCs. As a result, the linearity of the ADCs 142-1 through 142-m is increased, which will be described in detail with reference to FIGS. 9A and 9B later.

Referring to FIG. 2A, a blocking circuit 130a may include first through m-th blockers 132-1 through 132-m which may respectively correspond to the first through m-th ADCs 142-1 through 142-m. In other words, the first blocker 132-1 is connected to an input terminal of the first ADC 142-1 to block the influence of the operations of the other ADCs 142-2 through 142-m. Each of the other blockers 132-2 through 132-m is connected to the input terminal of a corresponding one of the ADCs 142-2 through 142-m to block the influence of the operation of the other ADCs.

Referring to FIG. 2B, a blocking circuit 130b may include one or more blockers 133-1 and 133-2 each connected in common to the input terminals of at least two ADCs. Although one blocker is connected to two ADCs in the exemplary embodiments illustrated in FIG. 2B, the inventive concept is not restricted to the current exemplary embodiments. For instance, the first through m-th ADCs 142-1 through 142-m may be divided into at least two groups and the blockers 133-1 and 133-2 may be connected in common to the input terminals of ADCs in corresponding one of the at least two groups.

The buffer 190 may include first through m-th memories 192-1 through 192-m respectively connected to the first through m-th ADCs 142-1 through 142-m and a sense amplifier 194. The first through m-th memories 192-1 through 192-m may temporarily store the digital pixel signals DP1 through DPm, respectively, and may sequentially output the digital pixel signals DP1 through DPm to the sense amplifier 194 according to the control of the column driver 150. The sense amplifier 194 may sense and amplify each of the digital pixel signals DP1 through DPm before outputting them to the ISP 220. The ISP 220 may process the digital pixel signals DP1 through DPm.

Figure 4:
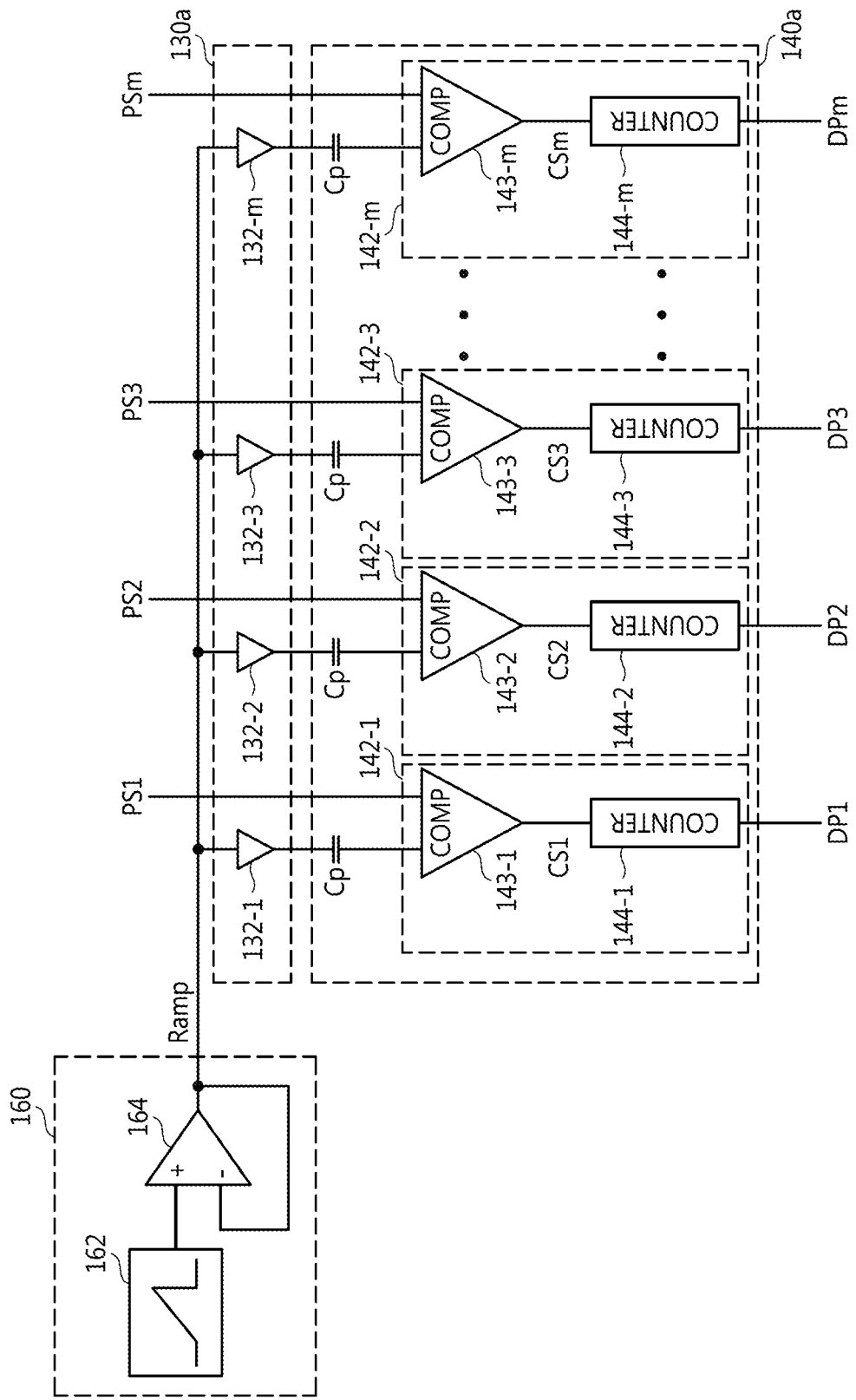
FIG. 4 is a diagram of a blocking circuit, an analog-to-digital converter (ADC) block, and a ramp signal generator of the image sensor illustrated in FIG. 2A or 2B according to some exemplary embodiments.

FIG. 4 is a diagram of the blocking circuit 130, the ADC block 140, and the ramp signal generator 160 illustrated in FIG. 2A or 2B according to some exemplary embodiments. Referring to FIG. 4, the ramp signal generator 160 may include a ramp signal unit 162 which generates the ramp signal Ramp and a ramp signal buffer 164 which buffers and outputs the ramp signal Ramp.

An ADC block 140a includes the first through m-th ADCs 142-1 through 142-m. The first through m-th ADCs 142-1 through 142-m include comparators 143-1 through 143-m, respectively, and counters 144-1 through 144-m, respectively. An input capacitor Cp may be connected to an input of each of the first through m-th comparators 143-1 through 143-m.

Each of the first through m-th comparators 143-1 through 143-m may receive the ramp signal Ramp as one input and one of the first through m-th pixel signals PS1 through PSm as another input. Each of the first through m-th comparators 143-1 through 143-m may compare the ramp signal Ramp with one of the first through m-th pixel signals PS1 through PSm and may generate one of first through m-th comparison signals CS1 through CSm according to the comparison result.

The first through m-th counters 144-1 through 144-m may respectively count the first through m-th comparison signals CS1 through CSm respectively received from the first through m-th comparators 143-1 through 143-m respectively connected to the first through m-th comparison signals CS1 through CSm and may output the digital pixel signals DP1 through DPm, respectively. The digital pixel signals DP1 through DPm may be stored in the buffer 190.

The blocking circuit 130a may include the first through m-th buffers 132-1 through 132-m, which may correspond to the first through m-th comparators 143-1 through 143-m, respectively. The first through m-th buffers 132-1 through 132-m may be connected between the ramp signal buffer 164 and the respective comparators 143-1 through 143-m.

Figure 5:
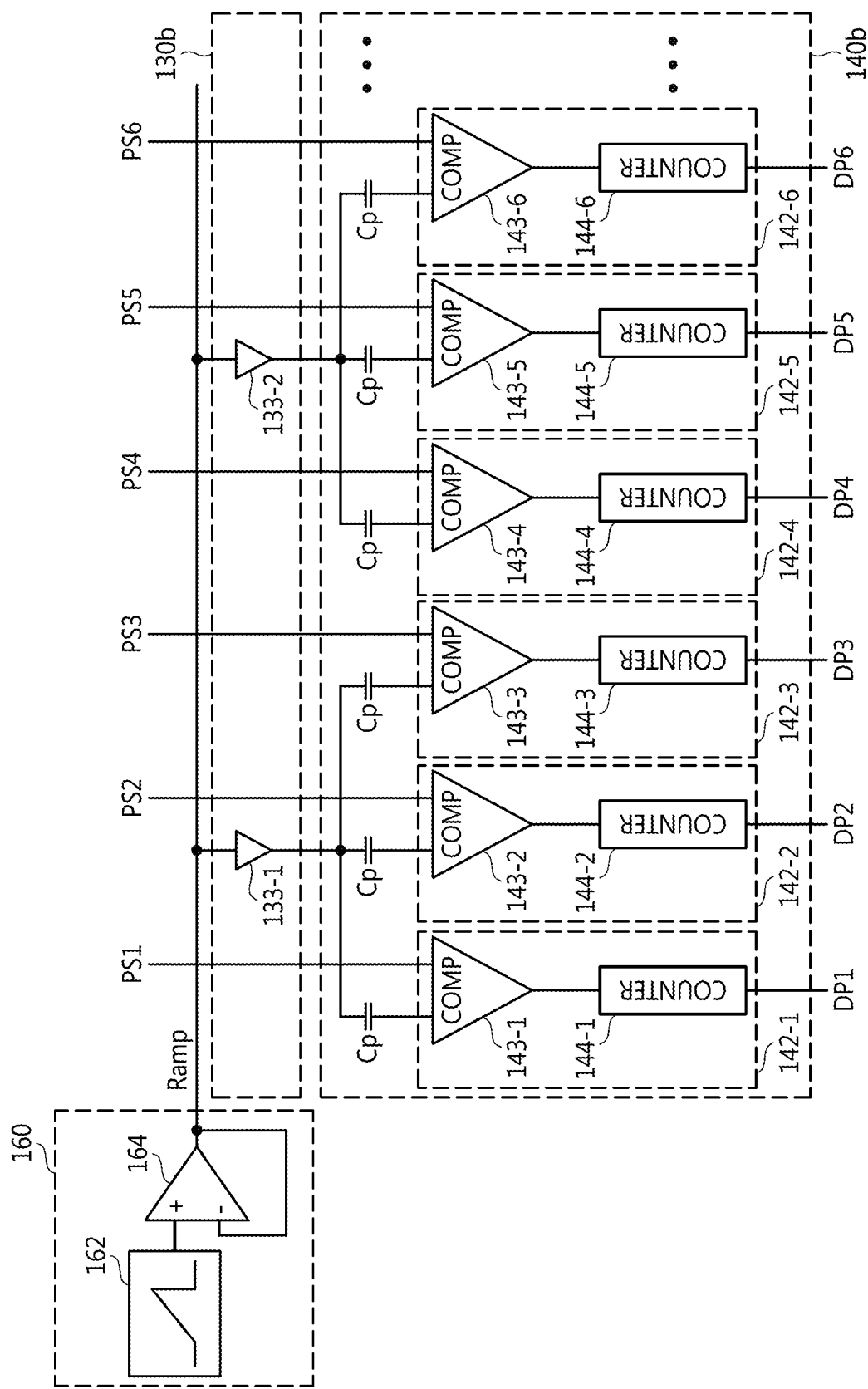
FIG. 5 is a diagram of the blocking circuit, the ADC block, and the ramp signal generator of the image sensor illustrated in FIG. 2A or 2B according to other exemplary embodiments.

FIG. 5 is a diagram of the blocking circuit 130, the ADC block 140, and the ramp signal generator 160 illustrated in FIG. 2A or 2B according to other exemplary embodiments. The structure and operations of the ramp signal generator 160 illustrated in FIG. 5 are the same as those of the ramp signal generator 160 illustrated in FIG. 4. The operations of an ADC block 140b illustrated in FIG. 5 are the same as those of the ADC block 140a illustrated in FIG. 4.

The blocking circuit 130b may include the first and second buffers 133-1 and 133-2. Each of the first and second buffers 133-1 and 133-2 may be connected in common to at least two of the first through m-th comparators 143-1 through 143-m. For instance, the first buffer 133-1 may be connected between the ramp signal buffer 164 and the input terminals of the respective first through third comparators 143-1 through 143-3, and the second buffer 133-2 may be connected between the ramp signal buffer 164 and the input terminals of the respective fourth through sixth comparators 143-4 through 143-6, as shown in FIG. 5 by way of example. As described above, the first through m-th comparators 143-1 through 143-m may be divided into groups of three comparators and one buffer 133-1 or 133-2 may be connected in common to an input terminal of one group, but the inventive concept is not restricted to the current exemplary embodiments. The number of ADCs or comparators in each group may be changed in other exemplary embodiments.

Figure 6:
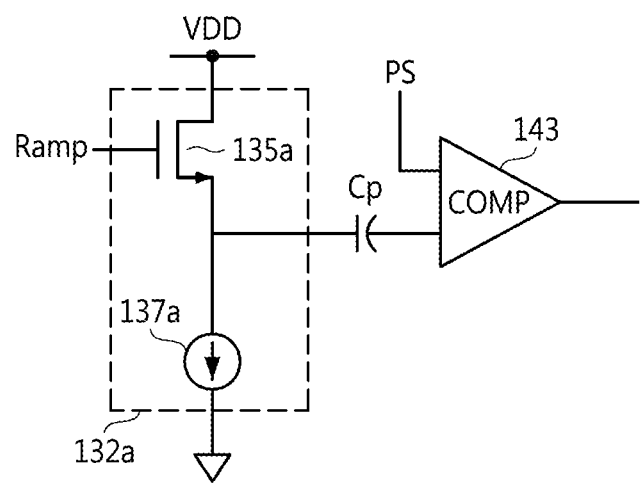
FIG. 6 is a circuit diagram of a buffer of the blocking circuit, the ADC block, and the ramp signal generator illustrated in FIG. 4 or 5 according to some exemplary embodiments.

FIG. 6 is a circuit diagram of a buffer illustrated in FIG. 4 or 5 according to some exemplary embodiments. A buffer 132a illustrated in FIG. 6 is a representative example of one of the buffers 132-1 through 132-m illustrated in FIG. 4 or one of the buffers 133-1 and 133-2 illustrated in FIG. 5.

Referring to FIGS. 4 through 6, the buffer 132a may include an N-channel metal oxide semiconductor (NMOS) transistor 135a and a current source 137a. The NMOS transistor 135a is connected between a power supply voltage VDD and the input terminal of a corresponding comparator 143 and has a gate receiving the ramp signal Ramp. The current source 137a may be connected between the input terminal of the comparator 143 and a ground voltage. The ground voltage may be a zero voltage, or a non-zero voltage.

Figure 7:
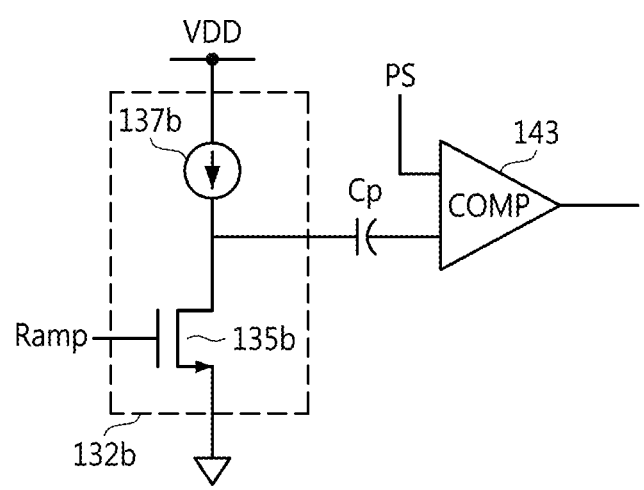
FIG. 7 is a circuit diagram of the buffer of the blocking circuit, the ADC block, and the ramp signal generator illustrated in FIG. 4 or 5 according to other exemplary embodiments.

FIG. 7 is a circuit diagram of the buffer illustrated in FIG. 4 or 5 according to other exemplary embodiments. A buffer 132b illustrated in FIG. 7 is a representative example of one of the buffers 132-1 through 132-m illustrated in FIG. 4 or one of the buffers 133-1 and 133-2 illustrated in FIG. 5.

Referring to FIGS. 4, 5, and 7, the buffer 132b may include a P-channel metal oxide semiconductor (PMOS) transistor 135b and a current source 137b. The PMOS transistor 135b is connected between the input terminal of the corresponding comparator 143 and the ground voltage and has a gate receiving the ramp signal Ramp. The current source 137b may be connected between the power supply voltage VDD and the input terminal of the comparator 143.

Figure 8A:
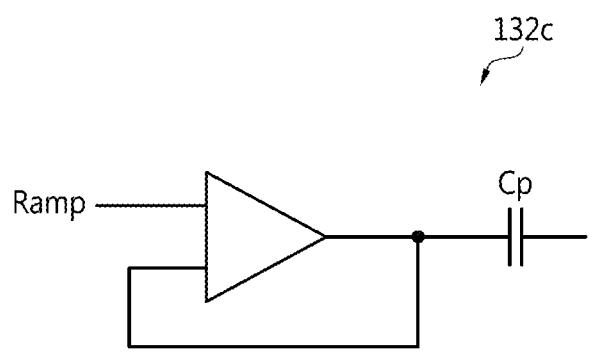
FIG. 8A is a circuit diagram of the buffer of the blocking circuit, the ADC block, and the ramp signal generator illustrated in FIG. 4 or 5 according to further exemplary embodiments.

FIG. 8A is a circuit diagram of the buffer illustrated in FIG. 4 or 5 according to further exemplary embodiments. A buffer 132c illustrated in FIG. 8 is a representative example of one of the buffers 132-1 through 132-m illustrated in FIG. 4 or one of the buffers 133-1 and 133-2 illustrated in FIG. 5. Referring to FIGS. 4, 5, and 8, the buffer 132c may be implemented as an analog buffer which has a first input terminal receiving the ramp signal Ramp and a second input terminal connected to an output terminal.

Figure 8B:
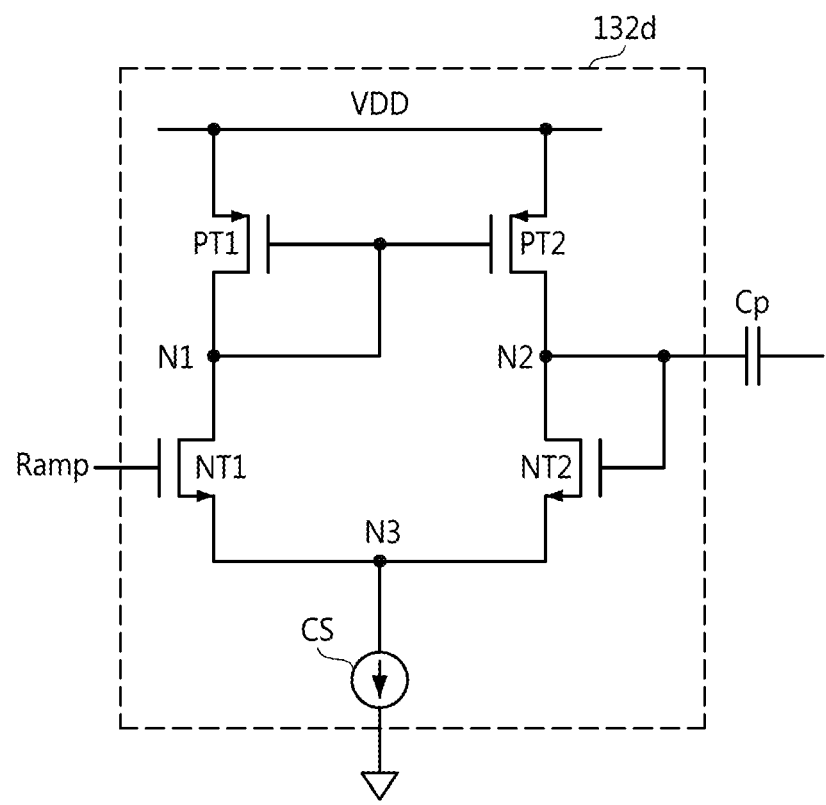
FIG. 8B is a detailed circuit diagram of the buffer illustrated in FIG. 8A.

FIG. 8B is a detailed circuit diagram of the buffer 132c illustrated in FIG. 8A. Referring to FIGS. 8A and 8B, the buffer 132c includes first and second PMOS transistors PT1 and PT2, first and second NMOS transistors NT1 and NT2, and a current source CS.

The first PMOS transistor PT1 is connected between the power supply voltage VDD and a first node N1. A gate of the first PMOS transistor PT1 is connected to a gate of the second PMOS transistor PT2 and the first node N1. The second PMOS transistor PT2 is connected between the power supply voltage VDD and a second node N2. The gate of the second PMOS transistor PT2 is connected to the gate of the first PMOS transistor PT1.

The first NMOS transistor NT1 is connected between the first node N1 and a common node N3 and receives the ramp signal Ramp through its gate. The second NMOS transistor NT2 is connected between the second node N2 and the common node N3. A gate of the second NMOS transistor NT2 is connected to an input terminal of a corresponding ADC. The current source CS is connected between the common node N3 and a ground voltage.

As described above, the ramp signal Ramp generated from the ramp signal generator 160 is not directly input to the comparators 143-1 through 143-m of the respective ADCs 142-1 through 142-m but is input through the buffers 132-1 through 132-m or 133-1 and 133-2 to the comparators 143-1 through 143-m of the respective ADCs 142-1 through 142-m. Therefore, while each of the comparators 143-1 through 143-m is comparing the ramp signal Ramp with a corresponding pixel signal PS, each comparator is protected from the influence of the operation of adjacent comparators. Such effect will be described with reference to FIGS. 9A and 9B.

Figure 9A:
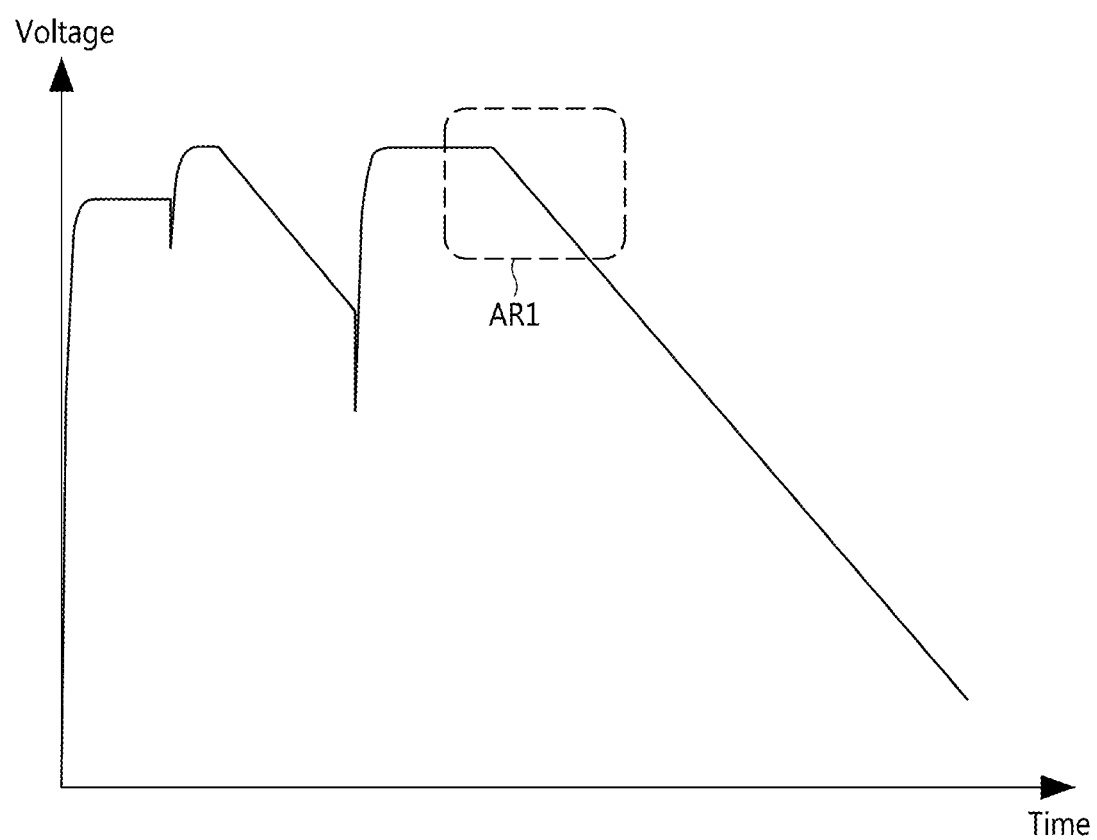
FIGS. 9A and 9B are graphs showing waveforms of a ramp signal in a comparison example.
Figure 9B:
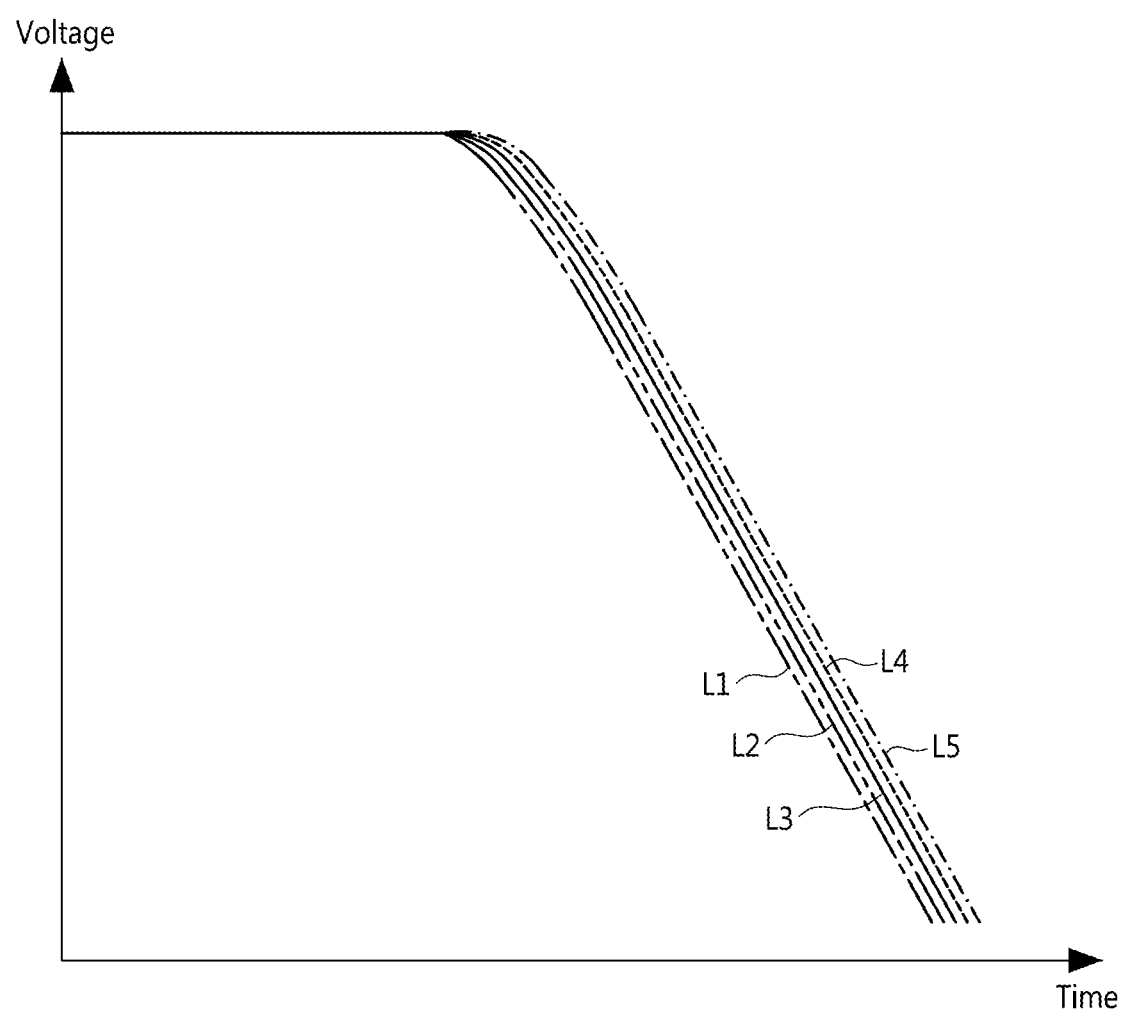

FIGS. 9A and 9B are graphs showing waveforms of the ramp signal Ramp in a comparison example. In detail, FIG. 9A shows the ramp signal Ramp when the blocking circuit 130 is not used and FIG. 9B shows the enlarged waveform of a part AR1 of the ramp signal Ramp illustrated in FIG. 9A.

Referring to FIGS. 9A and 9B, even when the ramp signal Ramp is generated by the one ramp signal generator 160, the slopes of the ramp signal Ramp may vary with the distribution of the pixel signals PS1 through PSm. In detail, the slope of a section of the ramp signal Ramp may vary with a ratio of dark signals to white signals among a total of "m" pixel signals PS1 through PSm.

For instance, it is assumed that "m" is 4000. When the ratio of dark signals to white signals among the pixel signals PS1 through PSm is 1:4 (for example, there are 800 dark signals and 3200 white signals), the ramp signal Ramp may have a slope of L1 (see FIG. 9B). When the ratio of dark signals to white signals among the pixel signals PS1 through PSm is 4:1 (for example, there are 3200 dark signals and 800 white signals), the ramp signal Ramp may have a slope of L5. However, FIGS. 9A and 9B show just exemplary graphs and the change in the slope with respect to the ratio of dark signals to white signals may be different from the ones shown in FIGS. 9A and 9B.

As described above, the slope of a part of the ramp signal Ramp changes depending on how many dark signals or white signals are included in the pixel signals PS1 through PSm. This change is because input capacitance changes before and after the decision of the comparators 143-1 through 143-m and the change in the input capacitance in the comparators 143-1 through 143-m exerts an influence on the ramp signal generator 160, changing the load of the ramp signal generator 160. For instance, when the dark signals and the white signals are mixed among the pixel signals PS1 through PSm, the input capacitance of each of the comparators 143-1 through 143-m changes before and after each of the comparators 143-1 through 143-m decides a dark signal or a white signal, thereby changing the load of the ramp signal generator 160.

When the slope of the ramp signal Ramp varies with the distribution of the pixel signals PS1 through PSm, as shown in FIGS. 9A and 9B; the linearity of the ramp signal Ramp deteriorates, which leads to the deterioration of the linearity of an ADC. As a result, noise occurs.

Moreover, when the blocking circuit 130 does not exist, the ramp signal generator 160 directly drives the comparators 143-1 through 143-m. In this case, parasitic capacitance at the output terminal of the ramp signal generator 160 significantly increases, and therefore, a settling time of the ramp signal Ramp also increases.

However, according to some exemplary embodiments, the blocking circuit 130 is provided so that the ramp signal generator 160 does not directly drive the comparators 143-1 through 143-*m*. Accordingly, the parasitic capacitance at the output terminal of the ramp signal generator 160 is reduced, and therefore, the settling time of the ramp signal Ramp is also reduced. In addition, the blocking circuit 130 prevents the change in the load of the ramp signal generator 160 caused by the change in input capacitance of the comparators 143-1 through 143-*m*.

In other words, the blocking circuit 130 prevents the change in input capacitance caused by the comparison operation of the comparators 143-1 through 143-*m* from influencing the ramp signal generator 160. Accordingly, even when the distribution of the pixel signals PS1 through PSm changes, the slope of the ramp signal Ramp is not changed, and therefore, the linearity of the ramp signal Ramp is increased. As a result, the linearity of an ADC is increased and image quality is thus increased.

The image sensor 100, 100*a*, or 100*b* may have at least ten million pixels and a counter's speed (i.e., an operating frequency) of GHz in the latest specifications. The influence of the non-linearity of the ramp signal Ramp and/or the non-linearity of an ADC on the image quality in such image sensors having at least ten million pixels and a high counter speed of GHz is much greater than that in image sensors having fewer pixels and lower counter speed. Therefore, the exemplary embodiments increase the linearity of the ramp signal Ramp and/or the linearity of an ADC in the latest and newest image sensors, thereby increasing the image quality.

Figure 10:
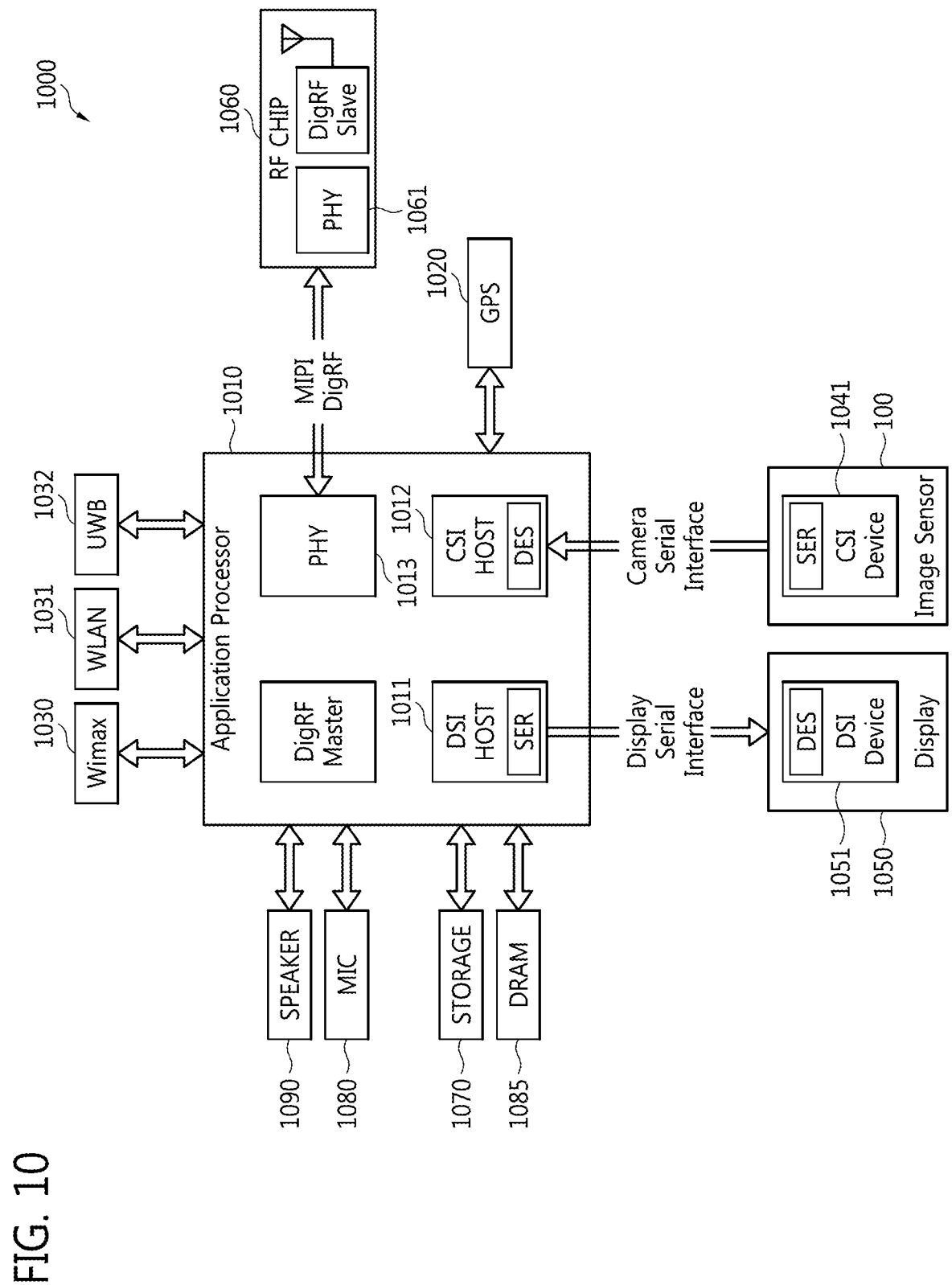
FIG. 10 is a block diagram of an electronic system including an image sensor according to some exemplary embodiments.

FIG. 10 is a block diagram of an electronic system including an image sensor according to some exemplary embodiments. Referring to FIG. 10, the electronic system 1000 may be implemented by a data processing apparatus, such as a mobile phone, a personal digital assistant (PDA), a portable media player (PMP), an IP TV, or a smart phone that can use or support the MIPI interface. The electronic system 1000 includes an application processor 1010, an image sensor 100, and a display 1050.

A camera serial interface (CSI) host 1012 included in the application processor 1010 performs serial communication with a CSI device 1041 included in the image sensor 100 through CSI. For example, an optical de-serializer (DES) may be implemented in the CSI host 1012, and an optical serializer (SER) may be implemented in the CSI device 1041.

A display serial interface (DSI) host 1011 included in the application processor 1010 performs serial communication with a DSI device 1051 included in the display 1050 through DSI. For example, an optical serializer may be implemented in the DSI host 1011, and an optical de-serializer may be implemented in the DSI device 1051.

The electronic system 1000 may also include a radio frequency (RF) chip 1060 which communicates with the application processor 1010. A physical layer (PHY) 1013 of the electronic system 1000 and a PHY 1061 of the RF chip 1060 communicate data with each other according to a MIPI DigRF standard. The electronic system 1000 may further include at least one element among a GPS 1020, a storage 1070, a microphone (MIC) 1080, a DRAM 1085 and a speaker 1090. The electronic system 1000 may communicate using Wimax (World Interoperability for Microwave Access) 1030, WLAN (Wireless LAN) 1031 and/or UWB (Ultra Wideband) 1032 etc.

Figure 11:
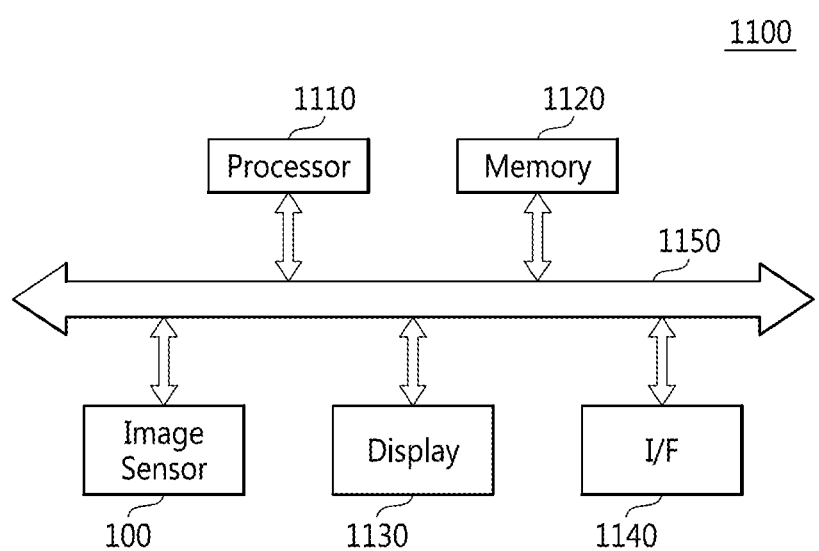
FIG. 11 is a block diagram of an image processing system including the image sensor according to some exemplary embodiments.

FIG. 11 is a block diagram of an image processing system 1100 including the image sensor 100 according to some exemplary embodiments. Referring to FIG. 11, the image processing system 1100 may be implemented by a mobile phone, a personal digital assistant (PDA), a portable media player (PMP), an IP TV, or a smart phone, but the exemplary embodiments are not restricted to them. The image processing system 1100 may include a processor 1110, a memory 1120, the image sensor 100, a display 1130, and an interface (I/F) 1140.

The processor 1110 may control the operation of the image sensor 100. The processor 1110 may be one or more microprocessors.

The memory 1120 may store a program for controlling the operation of the image sensor 100 through a bus 1150 according to the control of the processor 1110. The memory 1120 may also store the image. The processor 1110 may access the memory 1120 and execute the program. The memory 1120 may be formed as a non-volatile memory.

The image sensor 100 may generate image information, under the control of the processor 1110. The image sensor 100 may be embodied as a part of a camera module.

The display 1130 may receive the image from the processor 1110 or the memory 1120 and display the image on a display (e.g., a liquid crystal display (LCD) or an active-matrix organic light emitting diode (AMOLED) display). The I/F 1140 may be formed for the input and output of the two or three dimensional image. The I/F 1140 may be implemented as a wireless I/F.

The present general inventive concept can also be embodied as computer-readable codes that are stored on a computer-readable medium and executed by a processor or computer. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices.

The computer-readable recording medium can also be distributed over network coupled computer systems so that the computer-readable code is stored and executed in a distributed fashion. Also, functional programs, codes, and code segments to accomplish the present general inventive concept can be easily construed by programmers.

As described above, according to exemplary embodiments, an image sensor increases the linearity of an ADC, thereby increasing the quality of image signals.

While exemplary embodiments have been particularly shown and described, it will be understood by those of ordinary skill in the art that various changes in forms and details may be made therein without departing from the spirit and scope of the inventive concept as defined by the following claims.

What is claimed is:

1. An image sensor comprising:
   a plurality of pixels;
   a ramp generator configured to generate a ramp signal;
   a plurality of analog-to-digital converters (ADCs) including a first ADC, a second ADC, a third ADC and a fourth ADC;
   a first buffer including an input node configured to receive the ramp signal and a first output node connected to the first ADC and the second ADC;
   a second buffer including the input node configured to receive the ramp signal and a second output node connected to the third ADC and the fourth ADC;
   a first capacitor connected to the first ADC and the first buffer, a second capacitor connected to the second ADC and the first buffer, a third capacitor connected to the third ADC and the second buffer, and a fourth capacitor connected to the fourth ADC and the second buffer; and a first counter connected to the first ADC, a second counter connected to the second ADC, a third counter connected to the third ADC, a fourth counter connected to the fourth ADC, wherein the plurality of pixels have at least ten million pixels.

2. The image sensor of claim 1, wherein each of the first and second buffers includes a current source and a transistor connected to the current source.

3. The image sensor of claim 2, wherein the transistor is a p-type metal-oxide semiconductor (PMOS) transistor.

4. The image sensor of claim 2, wherein the transistor is an n-type metal-oxide semiconductor (NMOS) transistor.

5. The image sensor of claim 3, wherein the current source is located between the transistor and a power supply voltage.

6. The image sensor of claim 3, wherein the current source is located between the transistor and a ground node.

7. The image sensor of claim 4, wherein the current source is located between the transistor and a power supply voltage.

8. The image sensor of claim 4, wherein the current source is located between the transistor and a ground node.

9. The image sensor of claim 2, wherein an operation speed of each of the first to fourth counters is at least 1 GHz.

10. An image sensor comprising:
a plurality of pixels, each of the plurality of pixels being a 3T structure including a reset transistor connected to a floating diffusion, a driver transistor connected to the floating diffusion and a select transistor connected to the driver transistor;
a ramp generator configured to generate a ramp signal;
a first transistor, a second transistor, a third transistor, and a fourth transistor, each gate of the first to fourth transistors being configured to connect to the ramp generator;
a first analog-to-digital converter (ADC), a second ADC, a third ADC, and a fourth ADC, the first to fourth ADCs being configured to connect to the plurality of pixels;
a first capacitor connected to the first ADC and the first transistor, a second capacitor connected to the second ADC and the second transistor, a third capacitor connected to the third ADC and the third transistor, and a fourth capacitor connected to the fourth ADC and the fourth transistor; and
a first counter connected to the first ADC, a second counter connected to the second ADC, a third counter connected to the third ADC, a fourth counter connected to the fourth ADC,
wherein an operation speed of each of the first to fourth counters is at least 1 GHz.

11. The image sensor of claim 10, wherein the first to fourth transistors are p-type metal-oxide semiconductor (PMOS) transistors.

12. The image sensor of claim 10, wherein the first to fourth transistors are n-type metal-oxide semiconductor (NMOS) transistors.

13. The image sensor of claim 11, wherein the first to fourth transistors are connected to a ground node.

14. The image sensor of claim 13, further comprising a first current source connected to the first transistor, a second current source connected to the second transistor, a third current source connected to the third transistor and a fourth current source connected to the fourth transistor.

15. The image sensor of claim 14, wherein the first transistor is located between the first current source and the ground node, the second transistor is located between the second current source and the ground node, the third transistor is located between the third current source and the ground node, and the fourth transistor is located between the fourth current source and the ground node.

16. The image sensor of claim 15, wherein the plurality of pixels have at least ten million pixels.

17. The image sensor of claim 12, wherein the plurality of pixels have at least ten million pixels.

18. An image sensor comprising:
a plurality of pixels, each of the plurality of pixels being a 5T structure including a photo transistor, a transfer transistor connected to the photo transistor, a reset transistor connected to a floating diffusion, a driver transistor connected to the floating diffusion and a select transistor connected to the driver transistor;
a ramp signal generator configured to generate a ramp signal;
a first analog-to-digital converter (ADC) and a second ADC, the first ADC being configured to receive the ramp signal and connected to a first buffer and the second ADC being configured to receive the ramp signal and connected to a second buffer different from the first buffer; and
a first counter connected to the first ADC and a second counter connected to the second ADC,
wherein an operation speed of each of the first to second counters is at least 1 GHz.

19. The image sensor of claim 18, wherein each of the first and second buffers includes a current source and a transistor.

20. The image sensor of claim 19, wherein the transistor is a p-type metal-oxide semiconductor (PMOS) transistor.

* * * * *